US011512669B2

(12) United States Patent
Johnson

(10) Patent No.: US 11,512,669 B2
(45) Date of Patent: Nov. 29, 2022

(54) DISTRIBUTED AIRFOIL AEROSPIKE ROCKET NOZZLE

(71) Applicant: Raytheon Company, Waltham, MA (US)

(72) Inventor: Daniel K. Johnson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 16/910,342

(22) Filed: Jun. 24, 2020

(65) Prior Publication Data
US 2021/0404420 A1 Dec. 30, 2021

(51) Int. Cl.
*F02K 9/97* (2006.01)
(52) U.S. Cl.
CPC ........ *F02K 9/97* (2013.01); *F05D 2240/1281* (2013.01)
(58) Field of Classification Search
CPC ............................ F02K 9/97; F05D 2240/1281
See application file for complete search history.

(56) References Cited

U.S. PATENT DOCUMENTS

| | | | | |
|---|---|---|---|---|
| 2,928,235 A | * | 3/1960 | Christopher | .............. F02K 1/52 239/265.25 |
| 2,969,017 A | | 1/1961 | Kershner | |
| 3,112,612 A | * | 12/1963 | Berman | ..................... F02K 9/97 60/228 |
| 3,292,865 A | * | 12/1966 | Short | ........................ F02K 9/97 239/265.25 |
| 3,332,243 A | * | 7/1967 | Wilson | ..................... F02K 9/97 60/770 |

(Continued)

FOREIGN PATENT DOCUMENTS

GB 2509349 A 7/2014

OTHER PUBLICATIONS

Paul Johnson, "CFD Analysis of a Linear Aerospike Engine with Film-cooling", San Jose State University, California, Aug. 2019, pp. 1-62. (Year: 2019).*

(Continued)

*Primary Examiner* — Lorne E Meade
(74) *Attorney, Agent, or Firm* — Renner, Otto, Boisselle & Sklar, LLP

(57) ABSTRACT

A rocket engine nozzle manufacturable and applicable to tactical missile designs includes an aerospike having a plurality of airfoil fins distributed around a central longitudinal axis of a rocket engine combustion chamber. The aerospike is integrated on an exit plane at an exit end of the combustion chamber. The airfoil fins and an inner perimeter of the combustion chamber define a plurality of apertures which choke an airflow exiting the combustion chamber and cause the airflow to expand supersonically along the airfoil fins. The aerospike rocket engine nozzle requires less machine precision and achieves packing benefits over conventional bell and aerospike nozzle geometries. The configuration of the aerospike rocket engine nozzle also removes the producibility and heating constraints typically encountered with conventional aerospike nozzles in tactical missile applications while improving thrust performance of the rocket engine across a wide range of altitudes.

9 Claims, 2 Drawing Sheets

(56) References Cited

U.S. PATENT DOCUMENTS

| | | | |
|---|---|---|---|
| 3,358,453 A * | 12/1967 | Swet | F02K 9/972 |
| | | | 60/225 |
| 3,940,067 A * | 2/1976 | Cherry | F02K 9/97 |
| | | | 239/265.11 |
| 6,213,431 B1 | 4/2001 | Janeke | |
| 6,487,844 B1 * | 12/2002 | Lohn | F02K 9/88 |
| | | | 60/200.1 |
| 6,629,416 B1 | 10/2003 | Johnson | |
| 6,964,154 B1 * | 11/2005 | Sackheim | F02K 9/56 |
| | | | 60/224 |
| 7,565,797 B2 | 7/2009 | Nyberg | |
| 8,561,385 B2 * | 10/2013 | Ciezki | F42B 10/665 |
| | | | 60/230 |
| 9,115,666 B2 | 8/2015 | Chasman et al. | |
| 9,249,758 B2 | 2/2016 | Conrardy | |
| 11,352,978 B2 * | 6/2022 | Johnson | F02K 1/40 |
| 2007/0163227 A1 * | 7/2007 | Mano | F02K 9/978 |
| | | | 60/200.1 |
| 2009/0113873 A1 | 5/2009 | Tweeton | |
| 2011/0083418 A1 * | 4/2011 | Ciezki | F42B 10/64 |
| | | | 60/230 |
| 2012/0067983 A1 * | 3/2012 | Czingon | F27B 3/225 |
| | | | 239/589 |
| 2019/0003423 A1 | 1/2019 | Pelfrey | |
| 2019/0063372 A1 * | 2/2019 | Robinson | F02K 9/97 |
| 2020/0049103 A1 | 2/2020 | Craddock | |
| 2021/0404415 A1 * | 12/2021 | Johnson | F02K 1/40 |

OTHER PUBLICATIONS

International Search Report and Written Opinion dated Mar. 16, 2021 in corresponding International Application No. PCT/US2020/065217.

* cited by examiner

DISTRIBUTED AIRFOIL AEROSPIKE ROCKET NOZZLE

TECHNICAL FIELD

The present invention relates generally to aerospike rocket propulsion systems and more particularly to an aerospike rocket engine nozzle.

BACKGROUND

In rocket propulsion systems having a traditional bell rocket nozzle, optimized thrust performance can be achieved only at an altitude where the pressure of the airflow exiting the nozzle equals the ambient pressure. If the ambient pressure is greater than the pressure of the airflow exiting the nozzle, the exhaust plume of the rocket will be under-expanded. Alternatively, if the ambient pressure is less than the pressure of the airflow exiting the nozzle, the exhaust plume of the rocket will be over-expanded. In either of these described instances where the ambient pressure is not equal to the pressure of the airflow exiting the nozzle, thrust efficiency and rocket propulsion performance is lost. Instead, for a rocket having a traditional bell rocket nozzle that flies across various altitudes, thrust performance will only be optimized at one specific altitude.

Rocket propulsion systems having an aerospike rocket nozzle are capable of achieving optimal expansion of an exhaust plume of a rocket under a wide range of altitudes, improving thrust efficiency and rocket propulsion performance across an entire flight of the rocket. Specifically, instead of initially being encompassed by a bell rocket nozzle, the airflow exiting the rocket engine blast tube or combustion chamber flows across the aerospike and creates an exhaust plume that is contained by the ambient atmospheric pressure. However, conventional aerospike nozzles have an annular or linear geometry, neither of which are practical for use in tactical missile designs due to packing, producibility and heating constraints. For example, for an aerospike nozzle having an annular geometry, struts are required to hold the aerospike in a center of the exit opening of the combustion chamber. These struts pose a structural liability as they have the potential to cause blockage to the airflow exiting the combustion chamber, overheat and cause various other problems with the rocket propulsion system.

SUMMARY

In a general embodiment, a rocket engine nozzle manufacturable and applicable to tactical missile designs includes an aerospike having a plurality of airfoil fins distributed around a central longitudinal axis of a rocket engine combustion chamber. The aerospike is integrated on an exit plane at an exit end of the combustion chamber. The airfoil fins and an inner perimeter of the combustion chamber define a plurality of apertures which choke an airflow exiting the combustion chamber, causing the airflow to expand supersonically along the airfoil fins. The aerospike rocket engine nozzle requires less machine precision and achieves packing benefits over conventional bell and aerospike nozzle geometries. The configuration of the aerospike rocket engine nozzle also removes the producibility and heating constraints typically encountered with conventional aerospike nozzles in tactical missile applications while improving thrust performance of the rocket engine across a wide range of altitudes.

According to an aspect of the invention, a rocket engine nozzle includes an aerospike. The aerospike rocket engine nozzle includes a plurality of airfoil fins disposed at an exit end of a rocket engine combustion chamber and extending across an exit plane of the rocket engine combustion chamber. The plurality of airfoil fins are distributed around a central longitudinal axis. The plurality of airfoil fins and an inner perimeter of the rocket engine combustion chamber define a plurality of apertures between adjacent airfoil fins at the exit plane, the plurality of apertures being configured to choke an airflow exiting the rocket engine combustion chamber and cause the airflow to expand supersonically along the plurality of airfoil fins to create thrust.

According to an embodiment of any paragraph(s) of this summary, the plurality of airfoil fins are distributed axisymmetrically around the central longitudinal axis.

According to another embodiment of any paragraph(s) of this summary, the plurality of airfoil fins include three airfoil fins.

According to another embodiment of any paragraph(s) of this summary, the plurality of airfoil fins include four airfoil fins.

According to another embodiment of any paragraph(s) of this summary, the plurality of airfoil fins include five or more airfoil fins.

According to another embodiment of any paragraph(s) of this summary, each of the plurality of airfoil fins are fixed to the exit end of the rocket engine combustion chamber at the exit plane of the rocket engine combustion chamber.

According to another embodiment of any paragraph(s) of this summary, the aerospike rocket engine nozzle further includes a central airfoil hub from which each of the plurality of airfoil fins extend radially outward.

According to another embodiment of any paragraph(s) of this summary, a maximum length of the central airfoil hub in a longitudinal direction is less than or equal to a maximum length of the plurality of airfoil fins in the longitudinal direction.

According to another aspect of the invention, a rocket engine includes a rocket engine combustion chamber and a rocket engine nozzle. The rocket engine nozzle includes an aerospike including a plurality of airfoil fins disposed at an exit end of a rocket engine combustion chamber and extending across an exit plane of the rocket engine combustion chamber. The plurality of airfoil fins are distributed around a central longitudinal axis. The plurality of airfoil fins and an inner perimeter of the rocket engine combustion chamber define a plurality of apertures between adjacent airfoil fins at the exit plane. The plurality of apertures are configured to choke an airflow exiting the rocket engine combustion chamber and cause the airflow to expand supersonically along the plurality of airfoil fins to create thrust.

According to an embodiment of any paragraph(s) of this summary, the rocket engine combustion chamber is cylindrical.

According to another aspect of the invention, a method of operating a rocket propulsion system includes providing a rocket engine including a rocket engine combustion chamber and a rocket engine nozzle. The rocket engine nozzle includes an aerospike having a plurality of airfoil fins disposed at an exit end of the rocket engine combustion chamber and extending across an exit plane of the rocket engine combustion chamber. The plurality of airfoil fins are distributed around a central longitudinal axis. The plurality of airfoil fins and an inner perimeter of the rocket engine combustion chamber define a plurality of apertures between adjacent airfoil fins at the exit plane. The method also includes operating the rocket engine such that an airflow exits the rocket engine combustion chamber at the exit plane and the plurality of apertures choke the airflow exiting the rocket engine combustion chamber at the exit plane, causing the airflow to expand supersonically along the plurality of airfoil fins to create thrust.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

According to a general embodiment, an aerospike rocket nozzle 10 manufacturable and applicable to tactile missile systems achieves optimal expansion and thrust generation at a plurality of altitudes and ambient pressures with a smaller amount of hardware, in terms of both mass and volume, compared with conventional bell rocket nozzles. Additionally, the configuration of the aerospike rocket nozzle 10 disclosed herein reaps both performance and packaging benefits over conventional aerospike rocket nozzles and, unlike conventional aerospike rocket nozzles, is producible specifically for tactical missile systems. Specifically, for example, the aerospike rocket nozzle 10 disclosed herein has geometry having a shorter length and smaller diameter compared to conventional bell and aerospike nozzles, allowing for larger combustion chambers, blast tubes, and warheads.

Figure 1:
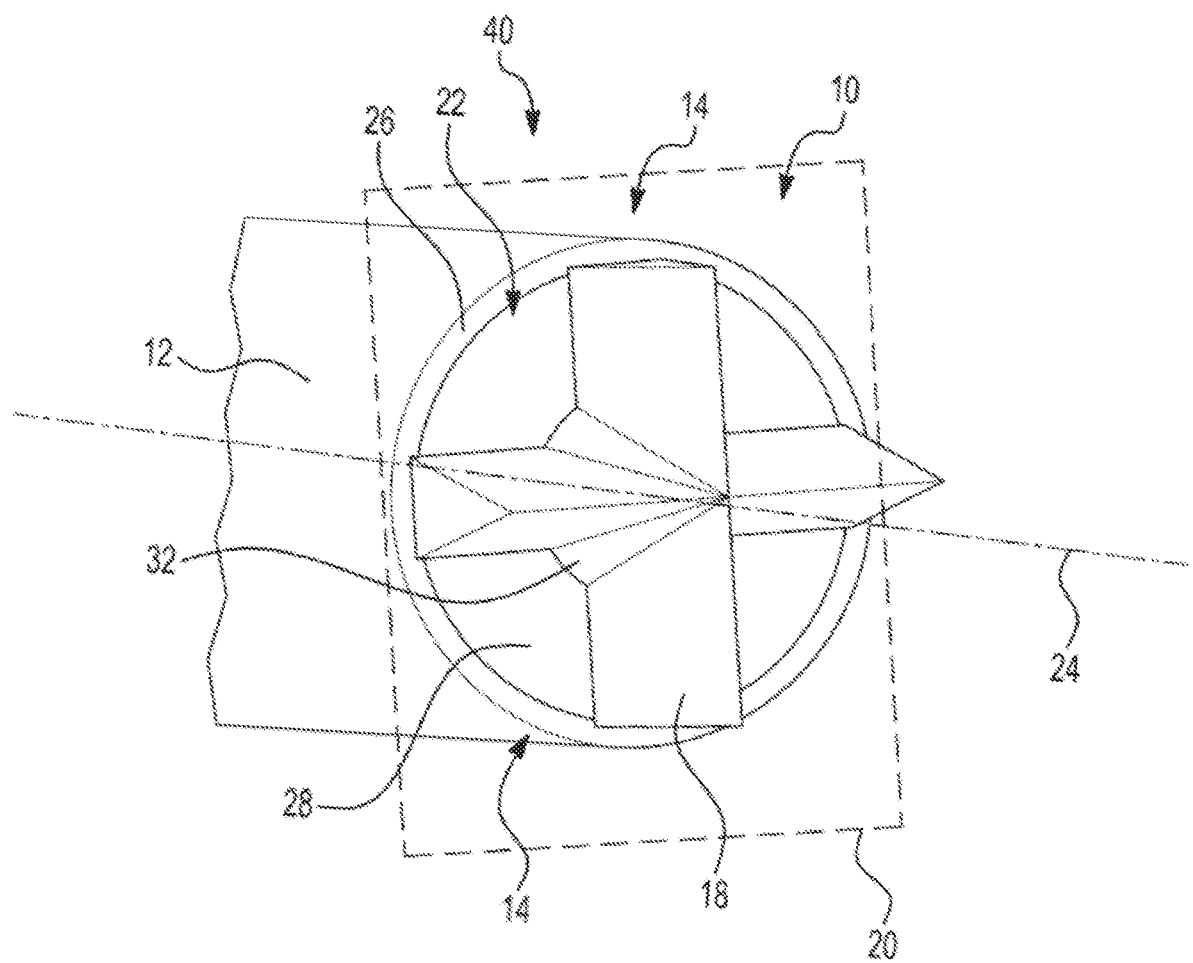
FIG. 1 is a perspective view of the aerospike rocket engine nozzle.

Referring now to the figures, and initially to FIG. 1, an exemplary embodiment is depicted of an aerospike rocket engine nozzle 10 manufacturable and applicable for use in a rocket engine 40 of (for example) a tactical missile. The rocket engine 40 includes a rocket engine combustion chamber 12 or rocket motor chamber. The rocket engine nozzle 10 is disposed at an exit end 14 of the rocket engine combustion chamber 12. The rocket engine nozzle 10 includes an aerospike having a configuration that achieves improved expansion and exit velocity of an airflow exiting the combustion chamber 12, and having a reduced dimension compared to conventional bell nozzles. Specifically, the aerospike rocket engine nozzle 10 includes a plurality of airfoil fins 18 disposed at the exit end 14 of the combustion chamber 12 and extending across an exit plane 20 of the combustion chamber 12. As illustrated in FIG. 1, the exit plane 20 is a plane that spans an exit opening 22 at the exit end 14 of the combustion chamber 12.

The plurality of airfoil fins 18 are distributed around a central longitudinal axis 24 at the exit plane 20. For example, in an embodiment in which the combustion chamber is cylindrical, the plurality of airfoil fins 18 may be distributed radially around the central longitudinal axis 24. Although in the illustrated embodiment, the combustion chamber 12 is cylindrical and the exit opening 22 is circular, the combustion chamber 12 and exit opening 22 may be of different shapes and sizes, for example polygonal or otherwise non-axisymmetric. In another embodiment, there may be multiple combustion chambers 12 wherein each of the plurality of airfoil fins 18 are disposed at an exit plane 20 of each combustion chamber 12. Stated differently, each airfoil fin 18 may be designated to one combustion chamber 12. In any embodiment, the central longitudinal axis 24 is an axis that extends along a center line of the rocket motor combustion chamber 12 and is perpendicular to the exit plane 20 at a center point of the exit opening 22.

Figure 2:
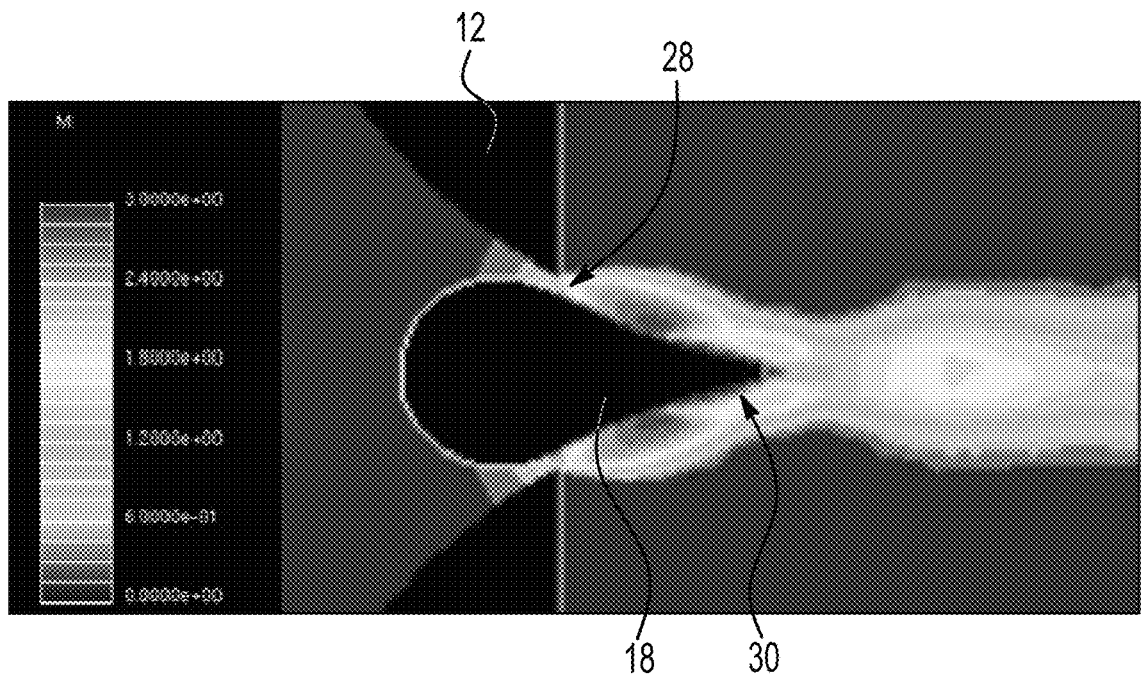
FIG. 2 is a simplified two-dimensional representation of supersonic expansion over an airfoil fin in an aerospike rocket engine nozzle.

The plurality of airfoil fins 18 and an inner perimeter 26 of the combustion chamber 12 at the exit opening 22 define a plurality of apertures 28 between adjacent airfoil fins 18 at the exit plane 20. These apertures 28 act as a nozzle throat, which chokes the airflow as it exits the combustion chamber 12 at the exit plane 20, causing the airflow to expand supersonically along the plurality of airfoil fins 18. A simplified two-dimensional representation of such supersonic expansion over an airfoil fin 18 is depicted in FIG. 2. The supersonically expanded airflow imparts a force on the aft surface 30 of each of the plurality of airfoil fins 18, generating a thrust that propels the missile in a forward direction. As the plurality of airfoil fins 18, and therefore the plurality of apertures 28 acting as the nozzle throat, are disposed at the exit plane 20 of the combustion chamber 12, the aerospike rocket engine nozzle 10 is configured for optimal expansion and thrust generation at a wide range of altitudes and ambient pressures.

In the illustrated embodiment the plurality of airfoil fins 18 are distributed axisymmetrically around the longitudinal axis 24. In this embodiment, therefore, the apertures 28 formed between adjacent airfoil fins 18 and the inner perimeter 26 of the combustion chamber 12 are equal in size. Accordingly, the thrust that is created will propel the missile in a relatively straight forward direction.

The plurality of airfoil fins 18 may include two or more distinct airfoil fins 18. For example, in an embodiment the plurality of airfoil fins 18 may include three distinct airfoil fins 18. In the illustrated embodiment the plurality of airfoil fins 18 include four distinct airfoil fins 18. In the illustrated embodiment, having four airfoil fins 18 distributed axisymmetrically around the longitudinal axis, the aerospike rocket engine nozzle 10 has a cruciform configuration. In another embodiment, the plurality of airfoil fins 18 may include five or more distinct airfoil fins 18.

The plurality of airfoil fins 18 are fixed to the exit end 14 of the combustion chamber 12 such that they do not rotate or translate in any direction. The plurality of airfoil fins 18 may be, for example, welded to the inner perimeter 26 of the combustion chamber 12 at the exit end 14. The plurality of airfoil fins 18 are additionally be welded, or otherwise fixed, to each other at the central longitudinal axis, such that the only contact between the aerospike rocket engine nozzle 10 and the combustion chamber 12 is where each of the plurality of airfoil fins 18 are fixed to the inner perimeter 26.

The aerospike rocket engine nozzle 10 may include a central airfoil hub 32, to which each of the plurality of airfoil fins 18 are fixed and from which each of the plurality of airfoil fins 18 extend radially outward. Each of the plurality of airfoil fins 18 may be welded, or otherwise fixed, to the central airfoil hub 32 at the central longitudinal axis 24. The central airfoil hub 32 may be configured such that a maximum length of the central airfoil hub 32 is less than or equal to a maximum length of the plurality of airfoil fins 18 in the longitudinal direction (the direction in which the longitudinal axis 24 extends). In this way, a majority of the airflow exiting the exit end 14 of the combustion chamber 12 is configured to supersonically expand across the plurality of airfoil fins 18 rather than the central airfoil hub 32. Therefore the supersonic expansion created by the plurality of airfoil fins 18 generates a majority of the thrust that propels the missile forward.

The aerospike rocket engine nozzle 10, including the plurality of airfoil fins 18 and the central airfoil hub 32, may be made of high temperature alloys such as titanium-zirconium-molybdenum (TZM), tungsten, carbon-carbon, or silica-filled ethylene propylene diene monomer (EPDM). The material thickness of the airfoil vanes 18 may be dependent on the specific implementation and environment in which they are to be used, such as whether they will be exposed to high temperatures, as this would affect the rate of erosion.

Figure 3:
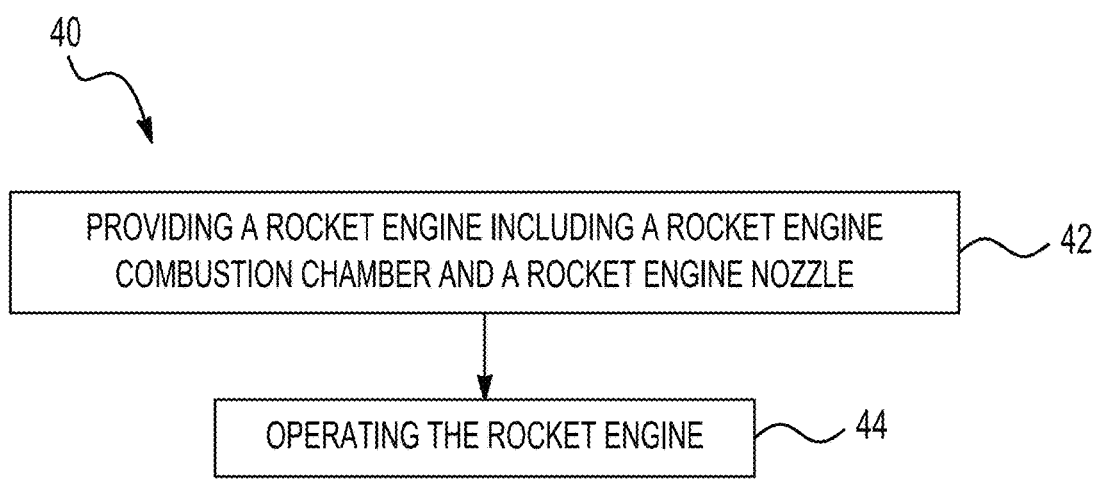
FIG. 3 is a flowchart of a method of operating a rocket engine.

With reference to FIG. 3, a method 40 of operating a rocket propulsion system is depicted. In step 42 the method includes providing a rocket engine. The rocket engine has a rocket engine combustion chamber and a rocket engine nozzle. The rocket engine combustion chamber may be cylindrical. The rocket engine nozzle includes an aerospike having a plurality of airfoil fins disposed at an exit end of a rocket engine combustion chamber and extending across an exit plane of the rocket engine combustion chamber. The plurality of airfoil fins are distributed around a central longitudinal axis, the central longitudinal axis being an axis that extends along a center line of the rocket motor combustion chamber, perpendicular to the exit plane at a center point of an exit opening at the exit plane.

In an embodiment, the aerospike rocket engine nozzle may further include a central airfoil hub from which each of the plurality of airfoil fins extend radially outward. A maximum length of the central airfoil hub in a longitudinal direction (the direction in which the longitudinal axis extends) is less than or equal to a maximum length of the plurality of airfoil fins in the longitudinal direction.

The plurality of airfoil fins may be distributed axisymmetrically around the central longitudinal axis. The plurality of airfoil fins may include three airfoil fins, four airfoil fins, or five or more airfoil fins. The plurality of airfoil fins may be fixed to the exit end of the rocket engine combustion chamber at the exit plane of the rocket engine combustion chamber. In any embodiment, the plurality of airfoil fins and an inner perimeter of the rocket engine combustion chamber define a plurality of apertures between adjacent airfoil fins at the exit plane. The method then includes, at step 44, operating the rocket engine such that an airflow exits the rocket engine combustion chamber at the exit plane and the plurality of apertures choke the airflow exiting the rocket engine combustion chamber at the exit plane, causing the airflow to expand supersonically along the plurality of airfoil fins to create thrust.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket engine comprising:
a rocket engine combustion chamber, and
an aerospike rocket engine nozzle including:
a plurality of airfoil fins disposed at an exit end of a rocket engine combustion chamber and extending across an exit opening of the rocket engine combustion chamber, the plurality of airfoil fins being distributed around a central longitudinal axis; and
a central airfoil hub from which each of the plurality of airfoil fins extend radially outward, wherein a maximum length of the central airfoil hub in a longitudinal direction is less than or equal to a maximum length of the plurality of airfoil fins in the longitudinal direction;
wherein the plurality of airfoil fins the central airfoil hub and the inner perimeter of the rocket engine combustion chamber define a plurality of apertures between adjacent airfoil fins at the exit opening, the plurality of apertures being configured to choke an airflow exiting the rocket engine combustion chamber and cause the airflow to expand supersonically along the plurality of airfoil fins to create thrust.

2. The rocket engine according to claim 1, wherein the rocket engine combustion chamber is cylindrical.

3. The rocket engine according to claim 1, wherein the plurality of airfoil fins include four airfoil fins.

4. The rocket engine according to claim 1, wherein each of the plurality of airfoil fins are fixed to the exit end of the rocket engine combustion chamber at the exit opening of the rocket engine combustion chamber.

5. A method of operating a rocket propulsion system, the method comprising:
providing a rocket engine including a rocket engine combustion chamber and an aerospike rocket engine nozzle, the aerospike rocket engine nozzle including:
a plurality of airfoil fins disposed at an exit end of the rocket engine combustion chamber and extending across an exit opening of the rocket engine combustion chamber, the plurality of airfoil fins being distributed around a central longitudinal axis,
a central airfoil hub from which each of the plurality of airfoil fins extend radially outward, wherein a maximum length of the central airfoil hub in a longitudinal direction is less than or equal to a maximum length of the plurality of airfoil fins in the longitudinal direction;
wherein the plurality of airfoil fins, the central airfoil hub and an inner perimeter of the rocket engine combustion chamber define a plurality of apertures between adjacent airfoil fins at the exit opening, and
operating the rocket engine such that an airflow exits the rocket engine combustion chamber through the exit opening and the plurality of apertures choke the airflow exiting the rocket engine combustion chamber through the exit opening, causing the airflow to expand supersonically along the plurality of airfoil fins to create thrust.

6. The method of operating a rocket propulsion system according to claim 5, wherein the plurality of airfoil fins include four airfoil fins.

7. An aerospike rocket engine nozzle comprising:
a plurality of airfoil fins disposed at an exit end of a rocket engine combustion chamber and extending across an exit opening of the rocket engine combustion chamber, the plurality of airfoil fins being distributed around a central longitudinal axis; and
a central airfoil hub from which each of the plurality of airfoil fins extend radially outward, wherein a maximum length of the central airfoil hub in a longitudinal direction is less than or equal to a maximum length of the plurality of airfoil fins in the longitudinal direction;
wherein the plurality of airfoil fins, the central airfoil hub and the inner perimeter of the rocket engine combustion chamber define a plurality of apertures between adjacent airfoil fins at the exit opening, the plurality of apertures being configured to choke an airflow exiting the rocket engine combustion chamber and cause the airflow to expand supersonically along the plurality of airfoil fins to create thrust.

8. The aerospike rocket engine nozzle according to claim 7, wherein the plurality of airfoil fins include four airfoil fins.

9. The aerospike rocket engine nozzle according to claim 7, wherein each of the plurality of airfoil fins are fixed to the exit end of the rocket engine combustion chamber at the exit opening of the rocket engine combustion chamber.

\* \* \* \* \*